United States Patent [19]

Moore

[11] Patent Number: 4,884,919

[45] Date of Patent: Dec. 5, 1989

[54] PIER CUSHIONING SYSTEM

[76] Inventor: Joe T. Moore, 1601 Amhurst Dr., Arlington, Tex. 76014

[21] Appl. No.: 299,460

[22] Filed: Feb. 23, 1989

[51] Int. Cl.$^4$ ............................................. E02B 3/22
[52] U.S. Cl. ................................... 405/212; 114/219; 267/116; 267/139; 405/211
[58] Field of Search ............... 405/211, 212; 267/116, 267/139; 188/279, 299; 114/219

[56] References Cited

U.S. PATENT DOCUMENTS

| | | | |
|---|---|---|---|
| 18,683 | 11/1857 | Day | 405/212 |
| 3,254,491 | 6/1966 | Levington | 414/215 |
| 3,362,742 | 1/1968 | Sanderson | 267/116 |
| 3,854,706 | 12/1974 | Johnston | 267/116 |
| 3,890,917 | 6/1975 | Ackroyd et al. | 405/212 |
| 3,933,111 | 1/1976 | von Bose et al. | 405/212 |
| 3,988,013 | 10/1976 | von Bose | 267/116 |
| 4,032,126 | 6/1977 | Laughlin | 267/116 |
| 4,043,545 | 8/1977 | Dial et al. | 405/212 X |
| 4,135,467 | 1/1979 | Loire et al. | 405/212 X |
| 4,137,861 | 2/1979 | Brummenaes | 114/219 |
| 4,257,581 | 3/1981 | Keeler | 293/134 X |
| 4,526,401 | 7/1985 | Kakizaki et al. | 188/299 X |
| 4,650,371 | 3/1987 | Sawaragi et al. | 405/211 |
| 4,662,791 | 5/1987 | Spicer | 405/211 X |

FOREIGN PATENT DOCUMENTS

| | | | |
|---|---|---|---|
| 1895 | 1/1977 | Japan | 405/212 |
| 39286 | 3/1977 | Japan | 114/219 |
| 146509 | 11/1981 | Japan | 405/212 |
| 1176013 | 8/1985 | U.S.S.R. | 405/212 |

Primary Examiner—Dennis L. Taylor
Assistant Examiner—Arlen L. Olsen
Attorney, Agent, or Firm—Michael A. O'Neil

[57] ABSTRACT

A pier cushioning system is disclosed having a contact surface, sliding elements and hydraulic cylinders and apparatus to determine the mass and velocity of a docking vessel and to respond with the necessary counterforce to assist in the docking of the vessel. The mass and velocity determining capabilities utilize a flow and pressure transducer in combination with either a microprocessor or analog electronic circuit to perform the necessary calculations and thus adjust the flow of hydraulic fluid within the hydraulic cylinder in accordance with the force exerted by the docking vessel.

11 Claims, 5 Drawing Sheets

PIER CUSHIONING SYSTEM

TECHNICAL FIELD

The present invention relates to a pier cushioning system for assisting in the docking of vessels and protecting piers, wharves and docks from damage caused by docking vessels, and in particular to a hydraulic pier cushioning system with the ability to determine the mass and velocity of the docking vessel.

BACKGROUND OF THE INVENTION

Piers, wharves and docks are utilized throughout the world to moor or berth vessels of all types. particularly in the case of larger vessels, such piers and wharves undergo constant battering from the vessels whenever they dock or depart at the port. As a consequence of such battering, pier, wharf and dock maintenance and repair operations have become both expensive and time consuming.

In addition, accidents involving vessels and piers during docking procedures are all too often a frequent occurrence, contributing even further to the expense of repairing and maintaining adequate docking facilities for vessels of the armed forces and civilian services. It is therefore evident that the use of some sort of pier cushioning system is mandated if pier repair and maintenance are to be controlled.

Pier cushioning systems are not new per se and have been used almost as long as piers themselves. Prior pier cushioning systems have included piles of timber, steel, reinforced concrete and pre-stressed concrete, timber hung systems, retractable fender systems, rubber fender systems, gravity-type fender systems and cushioning devices as exemplified in U.S. Pat. Nos. 4,662,791, 4,650,371, 4,137,861 and 4,135,467.

Prior pier cushioning systems have had inherent difficulties, however, such as low energy absorption capacity, biodeterioration of the construction material utilized in the cushioning system, vulnerability to corrosion, unsuitability at locations with significant tide and current effects, inability to be utilized with varying size vessels and high initial costs. Most importantly, however, prior pier cushioning systems have not eliminated the high maintenance and repair costs now associated with keeping a pier in operating condition.

The present invention provides an efficient hydraulic cylinder pier cushioning system having the unique ability to determine the mass and velocity of docking vessels. In practice, use of the invention alleviates much of the high maintenance and repair costs due to pier damage. Additionally, the present pier cushioning system may be utilized with any size vessel or at any location regardless of tide or weather conditions.

SUMMARY OF THE INVENTION

The pier cushioning system of the present invention comprises at least one floating segment having a contact surface made of a suitable material to lessen the impact of the vessel with the pier, a plurality of sliding elements connected to the contact surface of the floating segment for transmitting the force created by vessel impact with the contact surface of the segment, a plurality of hydraulic cylinders associated with the sliding elements capable of absorbing the energy transmitted from the sliding elements, apparatus for determining the mass and velocity of the docking vessel, and structural components connected to the hydraulic cylinders and the pier for transmitting the force absorbed by the hydraulic cylinders to the pier.

In the use of the invention the mass and velocity of a docking vessel are determined as the vessel approaches the pier and this data is used to adjust the flow of the hydraulic fluid within the hydraulic cylinders to that necessary to counteract the force of the approaching vessel as it docks. Thus, the use of the invention provides for constant monitoring and adjustment of the cylinder pressure, resulting in an optimum dissipation of the kinetic energy of the docking vessel. Another advantage of the present pier cushioning system is that the floating segment provides for automatic tide compensation. Additionally, since pier cushioning systems incorporating the invention may be constructed in segments, the system can be utilized along either the entire pier or a partial portion thereof.

The present pier cushion system can also be moved easily, serviced by segments and used between vessels if desired. Furthermore, with the capability of determining mass and velocity, the system may be utilized for vessels of all sizes. Finally, due to its construction and maneuverability, the pier cushioning system provides for soft, unassisted docking under normal conditions and for maximum protection of the pier and vessels under emergency or extreme weather conditions.

Thus, the present invention provides numerous advantages over prior pier cushioning systems and eliminates many of the deficiencies therein.

BRIEF DESCRIPTION OF THE DRAWINGS

A more complete understanding of the invention and its advantages will be apparent from the Detailed Description taken in conjunction with the accompanying Drawings, in which:

FIG. 7 is a perspective view of one embodiment of a hydraulic fluid flow control mechanism;

FIG. 8 is a perspective view of a second embodiment of a hydraulic fluid flow control mechanism;

DETAILED DESCRIPTION OF THE INVENTION

Figure 1:
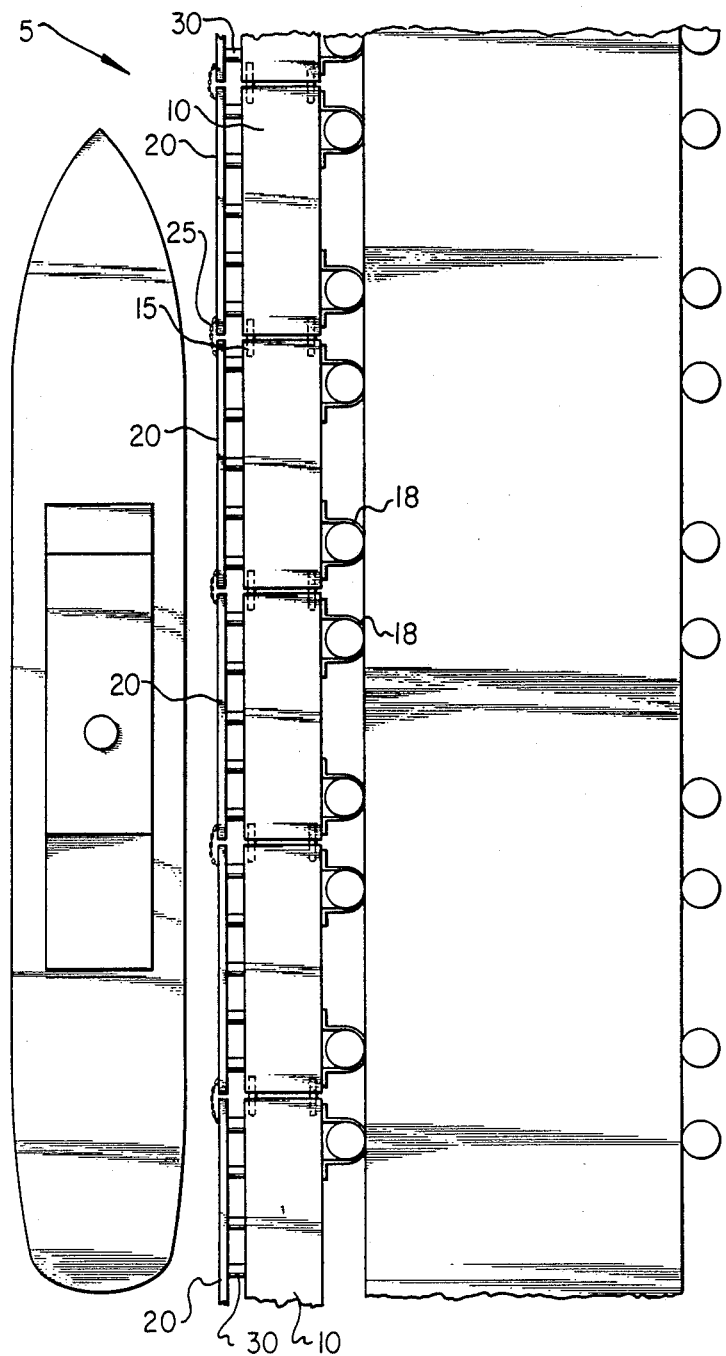
FIG. 1 is a schematic representation of the pier cushioning system.

Referring now to FIG. 1, therein is shown a schematic representative of the pier cushioning system 5 including a plurality of interconnected segments 10. The segments 10 are connected to one another by means of a first set of conventional structural components 15 and to the pier by a second set of conventional structural components 18. In one embodiment of the invention the components 15 comprise a series of removable pin arrangements and components 18 comprise a plurality of cables or chains attached to the segments 10 and the pier in such a manner as to allow the segments 10 to float an d thus compensate for tidal fluctuations. The structural components 18 provide for the transmission of force from the hydraulic cylinders 40 (not shown in FIG. 1 but disclosed in FIGS. 3, 4 and 5) to the pier.

A plurality of contact surfaces 20 are connected to the segments 10 by means of a plurality of sliding elements 30. The contact surfaces 20 of each of the segments 10 are connected to one another by conventional means 25. Conventional means 25 can be a plurality of chains, cables or ropes. The structural components 15 and 18 in conjunctions with conventional means 25 translate the motion of one adjacent segment 10 to another and keep the contact surfaces 20 from interfering with the longitudinally movement of a vessel along the pier.

Figure 2:
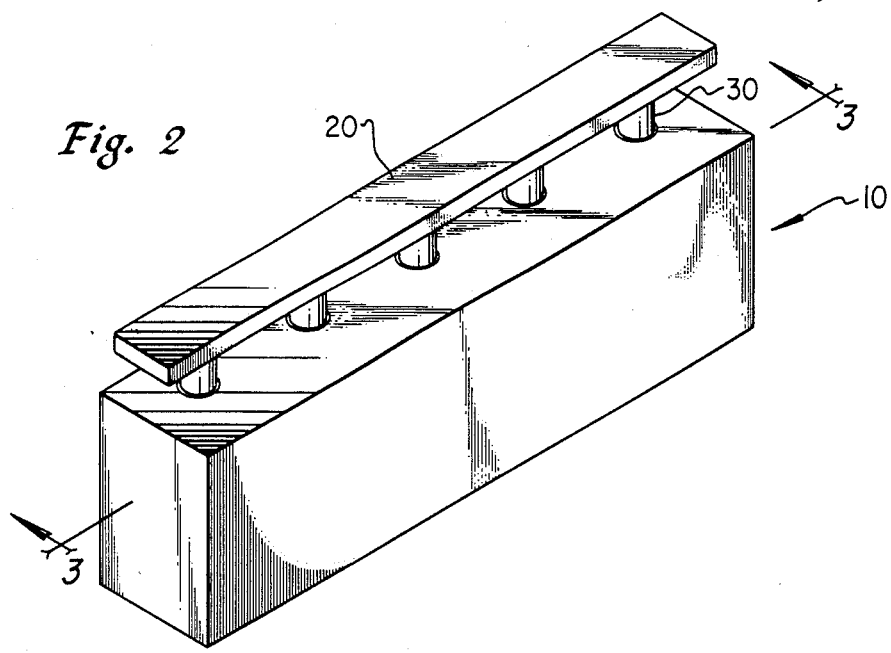
FIG. 2 is a perspective view of one segment of the pier cushioning system.

Turning now to FIG. 2, therein is shown a perspective view of one of the segments 10 of the pier cushioning system of the present invention. Segment 10 is constructed in such a manner as to allow the segment 10 to float and thus compensate for tidal changes by maintaining optimum contact with the docking vessel near the water line. Although segment 10 may be made of any suitable material, in at least one embodiment of the invention it is constructed of steel.

Also disclosed in FIG. 2 is the contact surface 20 and its connection to a plurality of sliding elements 30 that extend from segment 10. The contact surface 20 may be made of any suitable surface for vessel contact but tin one embodiment of the invention is a soft slick surface. Suitable surface materials would include at least wood, rubber, plastic or other polymeric materials.

Sliding elements 30 are connected to the contact surface 20 at a first end and to a plurality of hydraulic cylinders (not shown in FIG. 2 but disclosed in FIGURES 3, 4 and 5) at a second end. The sliding elements 30 transmit the force exerted upon the contact surface 20 from a docking vessel to the plurality of individual hydraulic cylinders. Although any conventional mechanism may be used to connect the contact surface 20 with the sliding elements 30, in at least one embodiment a conventional pin arrangement is utilized that allows for the uneven compression of the contact surface 20 by the docking vessel.

Figure 3:
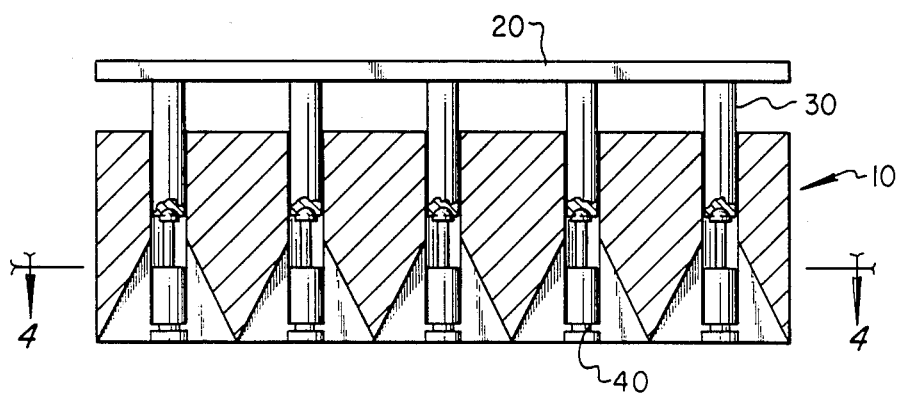
FIG. 3 is a cross-sectional view taken along the lines 3—3 of FIG. 2.

Turning to FIG. 3, a cross-sectional view along the lines 3—3 of FIG. 2, therein it is more clearly shown that sliding elements 30 are cylindrical in shape in at least one embodiment of the invention. Furthermore, the sliding elements 30 are generally hollow and usually of a metal construction. FIG. 3 also illustrates the connection between the sliding elements 30 and the hydraulic cylinders 40 in the interior of segment 10.

The hydraulic cylinders 40 are capable of absorbing the energy of the docking vessel transmitted by the sliding elements 30 from the contact surface 20 by exerting an equal and opposing force to that transmitted by the sliding elements 30.

The number of hydraulic cylinders 40 varies depending on a number of factors including the following: (1) the maximum acceptable hull pressure the docking vessel can withstand; (2) the size of the contact surface 20; (3) the number of hydraulic cylinders 40 per segment 10; (4) the length of the segment 10; and (5) the maximum acceptable load per length the pier structure can withstand.

The hydraulic cylinders 40 utilize a valve assembly 110 (shown in FIG. 6) to apply the necessary force to bring the docking vessel to rest against the pier regardless of the vessel's velocity or mass.

Figure 4:
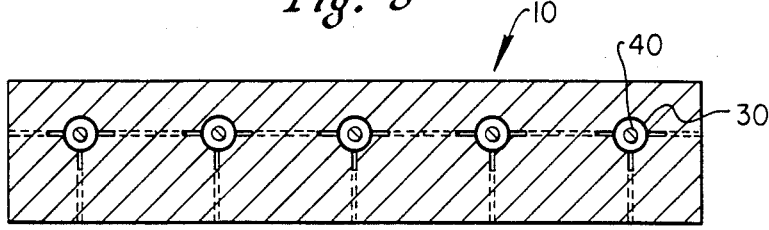
FIG. 4 is a cross-sectional view along the lines 4—4 of FIG. 3.

FIG. 4, a cross-sectional view along the lines 4—4 of FIG. 4, further illustrates segment 10, sliding elements 30 and hydraulic cylinders 40 and more clearly discloses the spacing of the hydraulic cylinders 40 in the present invention. The hydraulic cylinders 40 may be interconnected with the conventional structural components 15 and 18 (shown in FIG. 1).

Figure 5:
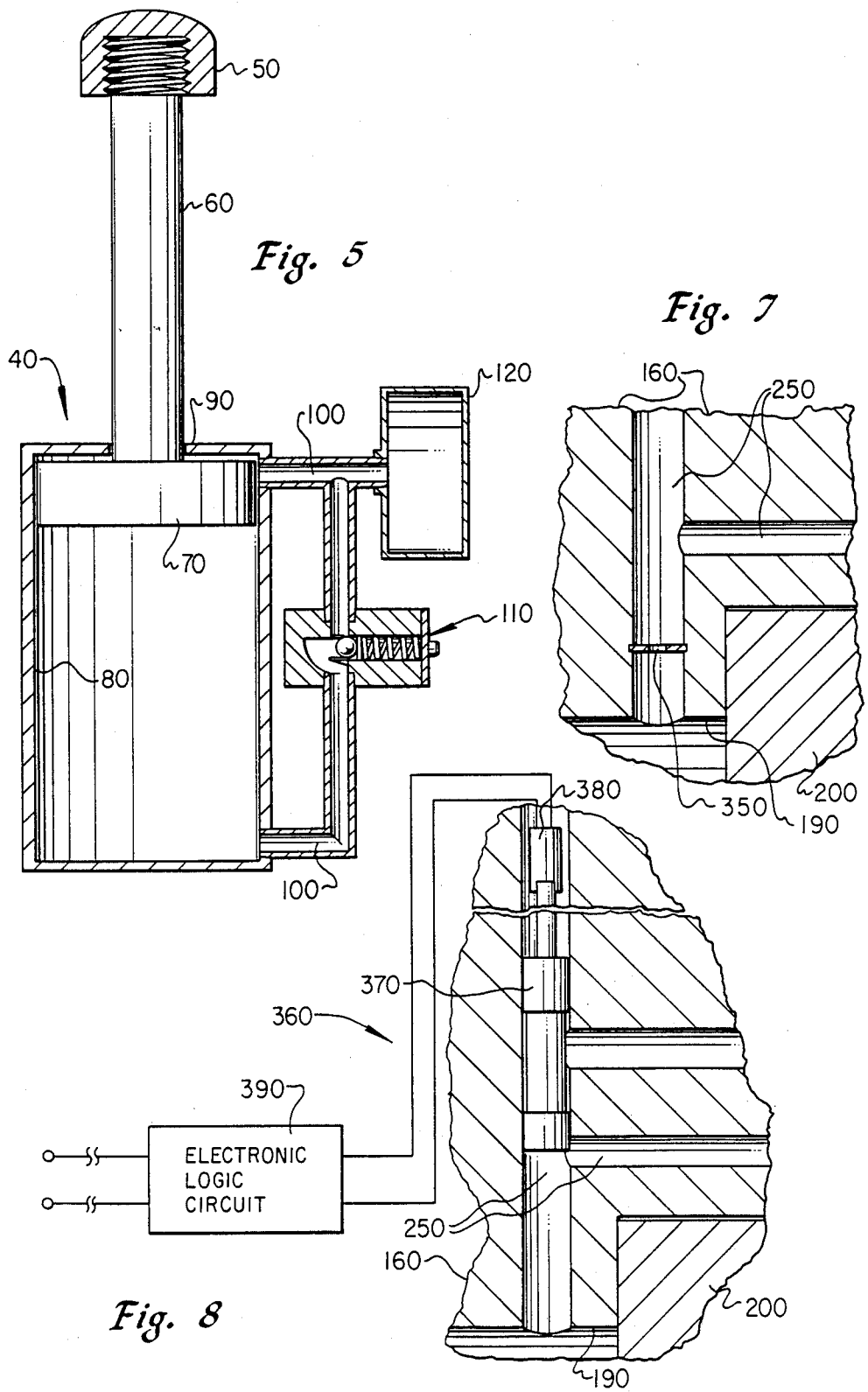
FIG. 5 is a cross—sectional view of the hydraulic cylinder and valve assembly of the pier cushioning system.

FIG. 5 provides a more detailed disclosure of one of the hydraulic cylinders 40. The disclosed hydraulic cylinder 40 has a shaft end piece 50 that provides the contact point for the sliding element 30 (not shown). Additionally, the shaft end piece 50 is constructed so as to allow for slight misalignment between the shaft end piece 50 and sliding element 30. A shaft 60 connects the shaft end piece 50 to the cylinder piston 70. The dimensions and size of the shaft end piece 50, shaft 60 and piston 70 may vary depending on the necessary design requirements for the pier involved.

The hydraulic cylinder 40 also has an interior cylinder 80 which contains the hydraulic fluid and acts as a supporting structure. A seal element 90 prevents the hydraulic fluid from escaping along the path of the shaft 60. There are hollow flow channels 10 which connect with the interior cylinder 80 of the hydraulic cylinder 40 and provide a path for the flow of the hydraulic fluid as the piston 70 moves. The movement of the hydraulic fluid is controlled by a hydraulic valve assembly 110 connected to the hollow flow channels 100.

An accumulator 120, also connected to the hollow flow channels 100 contains a pressurized element that provides for the displacement of the hydraulic fluid as the shaft 60 pushes the cylinder piston 70 into the interior container 80 of the hydraulic cylinder 40. Although any pressurized element, such as a gas, may be used, in at least one embodiment of the invention, such pressurized element is nitrogen. The pressurized element supplies sufficient restoring force to reset or re-extend the piston 70 and shaft 60 after the impact event of the vessel docking to the pier is complete.

Figure 6:
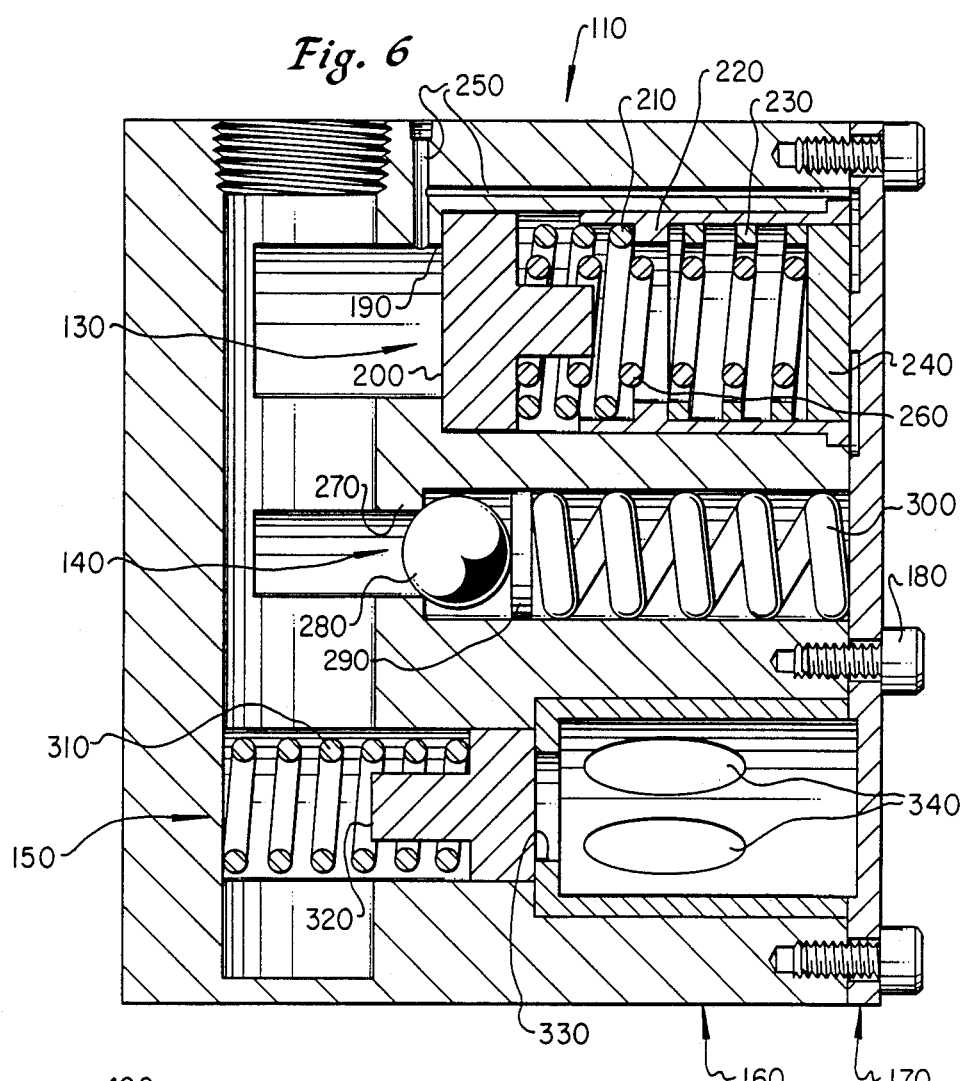
FIG. 6 is a cross-sectional view of the valve assembly of the hydraulic cylinder.

FIG. 6 discloses that the valve assembly 110 comprises several major valve components. The first valve component is a regulating or control valve 130. The control valve 130 contains apparatus for determining the docking vessel's mass and velocity. A second valve component is a relief valve 140 that prevents the pressure from exceeding the maximum acceptable level of force. Finally, the third major valve component is a reset valve 150 that allows the return of the hydraulic fluid with little or no resistance, thus restoring the hydraulic cylinder 40 to its original state.

All of the valve components of the valve assembly 110 are contained within a valve body 160 that provides the support structure for the valve components and flow passages for the hydraulic fluid. An access cover 170 provides for access to the valve components for repair, maintenance and the addition of hydraulic fluid when necessary. Although the access cover 170 may be secured by any conventional means in at least one embodiment of the invention, the access cover is secured with threaded fasteners 180.

The control valve 130 has an integral valve seat 190 on which rests a valve piston 200. A primary valve spring 210 provides for an initial pre-set opening pressure. A sleeve 220 provides backing for the primary valve spring 210. Also disclosed is an upper piston counterspring 230 which resists the downward movement of an upper piston 240. The upper piston 240 moves downward at a rate controlled by the hydraulic fluid flow through the control passage 250.

The hydraulic fluid flow may be controlled by either of the two methods described hereinafter in FIGS. 7 and 8 or by other conventional mechanisms. As the hydraulic fluid flows to the control valve 130 through the passage 250, the upper piston 240 moves downward and compresses a control spring 260. The compression of the control spring 260 closes the valve piston 200, causing an increase in the pressure in the interior cylinder 80 of the hydraulic cylinder 40. This progression continues until the desired deacceleration of the docking vessel has been reached.

The relief valve 140 operates in a manner similar to the control valve 130 and also contains a valve seat 270 on which rests a ball piston 280. There is also a piston spring surface 290 and a valve spring 300. The relief valve 140 is pre-set to open at or before the predetermined maximum pressure or force is reached.

The reset valve 150 is closed during the docking of the vessel at the pier and opens only afterwards to allow return of the hydraulic fluid with little resistance during reset. The reset valve 150 has a spring 310 which exerts a light force on a piston 320, keeping the piston 320 closed. An insert seat 330 provides a seat for the piston 320 as well as providing flow passages 340 for the returning hydraulic fluid.

As noted earlier, the hydraulic fluid flow through the passage 250 may be controlled by two different embodiments of the present invention as well as by other conventional mechanisms.

The first hydraulic fluid control embodiment of the invention is an orifice control method disclosed in FIGURE 7. The passageway 250 has an orifice 350 near the valve piston 200 and valve seat 190. All of the components are located inside the valve body 160. The orifice 350 is installed in the passage 250 leading from the inlet side of the control valve 130 near the valve piston 200. The orifice 350 connects to the passage 250 leading to the upper piston 240 of the control valve 130. The orifice 250 is sized to attain a metered timed flow to the upper piston 240. This in turn provides a timed increase in the hydraulic cylinder 40 pressure or force.

When properly sized, the orifice 350 compensates for the velocity and mass variations of the varying docking vessels. This method is based on the relationship force equals mass times acceleration (F=ma). The larger the mass the less the timed increase in pressure will affect the mass, and the pressure will be allowed to reach a higher level. The higher the velocity the higher the pressure will be in the cylinder by virtue of the fluid's resistance to flow. The orifice 350 may also be equipped with a check valve which restricts the backflow through the orifice 350 as the pressure drops due to the decreasing velocity.

The second hydraulic fluid flow control embodiment of the invention is an electronic pilot spool 360 disclosed in FIG. 8. The electronic pilot spool 360 allows for continuous monitoring and control of the hydraulic cylinder pressure. The electronic pilot spool 360 contains a spool valve 370 that provides for the supply and return of hydraulic fluid to the upper piston 240 (shown in FIG. 6) and is controlled by an electronic actuator 380 which receives a signal from an electronic logic circuit 390.

The electronic logic circuit 390 may be of any commercially available type. Conventional and commercially available flow and pressure transducers (not shown in FIG. 8 but shown in FIG. 9) are installed in the hollow flow channels 100 leading to the valve assembly 110. In one embodiment of the invention, the electronic logic circuit comprises any commercially available microprocessor 420 (FIG. 9) which is programmed using the following relationships:

(1) F=ma;
(2) $Fx = \Delta Ke = \frac{1}{2} mv^2$;
(3) $\Delta X = V \Delta t$ where
F=force is proportional to pressure P,
M=mass,
a=acceleration which is defined as $$\frac{\Delta v}{\Delta t}$$

(Divided By)
$\Delta$=change
x=distance is=stroke (Determined by Cylinder Design) - $\Delta x$,
$\Delta t$=incremental time which is provided by an internal clock,
v=velocity which is proportional to flow (Q) (Q is Flow).

The microprocessor will measure pressure $P_1$ and flow $Q_1$ at the beginning of the impact event. After an incremental time $\Delta t$, the microprocessor measures $P_2$ and $Q_2$. At this time, the microprocessor makes a calculation of m by using the relationship F=ma;

$$K_1 \frac{P_1 + P_2}{2} = Mk_2 \frac{V_1 - V_2}{\Delta t}$$

$$m = k_3 \frac{(P_1 + P_2) \Delta t}{2(V_1 - V_2)}$$

The microprocessor then calculates $\Delta x$ using:

$$\Delta X = \frac{V_1 + V_2}{2}$$

AND $X + X + \Delta X$

At this point the microprocessor calculates a force or pressure to be attained so that the energy will be dissipated in the remaining stroke of the unit.

$$Fx = 1/2\ mv^2$$
$$X = (\text{stroke} - x)\ V = V_2$$

$$K_4\ P_{output} = K_5 \frac{(P_1 + P_2)\ \Delta t\ V_2^2}{2(V_1 - V_2)(\text{stroke} - X)}$$

$$\text{OR}\ P_{out} = k_6 \frac{(P_1 + P_2)(Q_2)^2\ \Delta t}{(Q_1 - Q_2)(\text{stroke} - X)}$$

These calculations can be performed by utilizing the following FORTRAN program:

| | FORTRAN PROGRAM | |
|---|---|---|
| 10 | I = 1 | (Initialize Counter) |
| 20 | Read T | (Reads from Internal Clock) |
| 30 | Read P | (Reads from Presssure Transducer) |
| 40 | Read Q | (Reads from Flow Transducer) |
| 50 | Vel =Q/Area | (Velocity equals Flow Divided by Piston Area) |
| 60 | F =P*Area | (Force equals Pressure Times Area) |
| 70 | If I LE 1 Go To 90 | |
| 80 | Go To 130 | |
| 90 | Vel1 =Vel | |
| 100 | TO =O | |
| 110 | F1 =F | |
| 120 | Go To 20 | |
| 130 | Favg =(F +F1)/2 | |
| 140 | DT =T −TO | |
| 150 | Acc =(v1 −V)/DT | (Acceleration equals Change in V/Time |
| 160 | X =V1*DT | (Distance equals Velocity Times Time) |
| 170 | Mass =Favg/Acc Acceleration) | (From Force equals Mass Times |
| 180 | OUTPUT =(Mass*V*V)/(2*(Stroke-X))  (From FX =1/2MV2) | |
| 190 | If V LE .0001 To To 270 | |
| 200 | F1 =F | |
| 210 | V1 =V | |
| 220 | TO =T | |
| 230 | Write Output (Sends output Signal to Actuator) | |
| 240 | I =I +1 | |
| 250 | If I GE 100,000 Go To 270 (Protects Against Endless Loop) | |
| 260 | Go To 20 | |
| 270 | Stop | |
| 280 | End | |

Other various programming languages or other programs may be used that achieve the same calculations. As these calculations are made, the data in the form of an output signal is sent to the valve actuator 380 and the spool valve 370 moves accordingly. This operation continues throughout the duration of the impact event as the vessel docks. This allows for constant monitoring and adjustment of the cylinder pressure, resulting in an optimum dissipation of the kinetic energy of the docking vessel.

Figure 9:
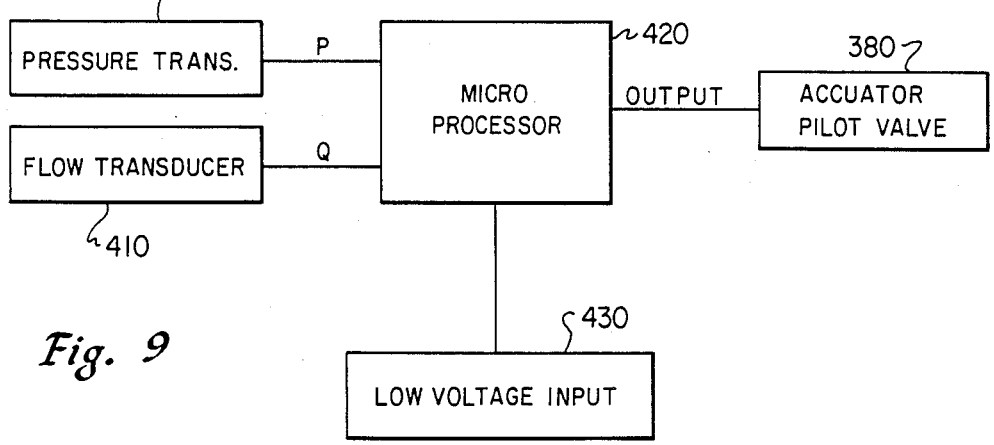
FIG. 9 is a flow diagram of one embodiment of an apparatus for determining the mass and velocity of a docking vessel used in the practice of the invention.

Turning to FIG. 9, therein is shown a flow diagram of the electronic pilot spool control unit including the pressure transducer 410 and flow transducer 410 and their connection with a microprocessor 420 which performs the data calculations as defined above. The microprocessor data output is transmitted to the actuator pilot valve 380 which in turn regulates the hydraulic fluid flow. Any conventional low voltage input 430 can provide the necessary current to operate the microprocessor 420.

Figure 10:
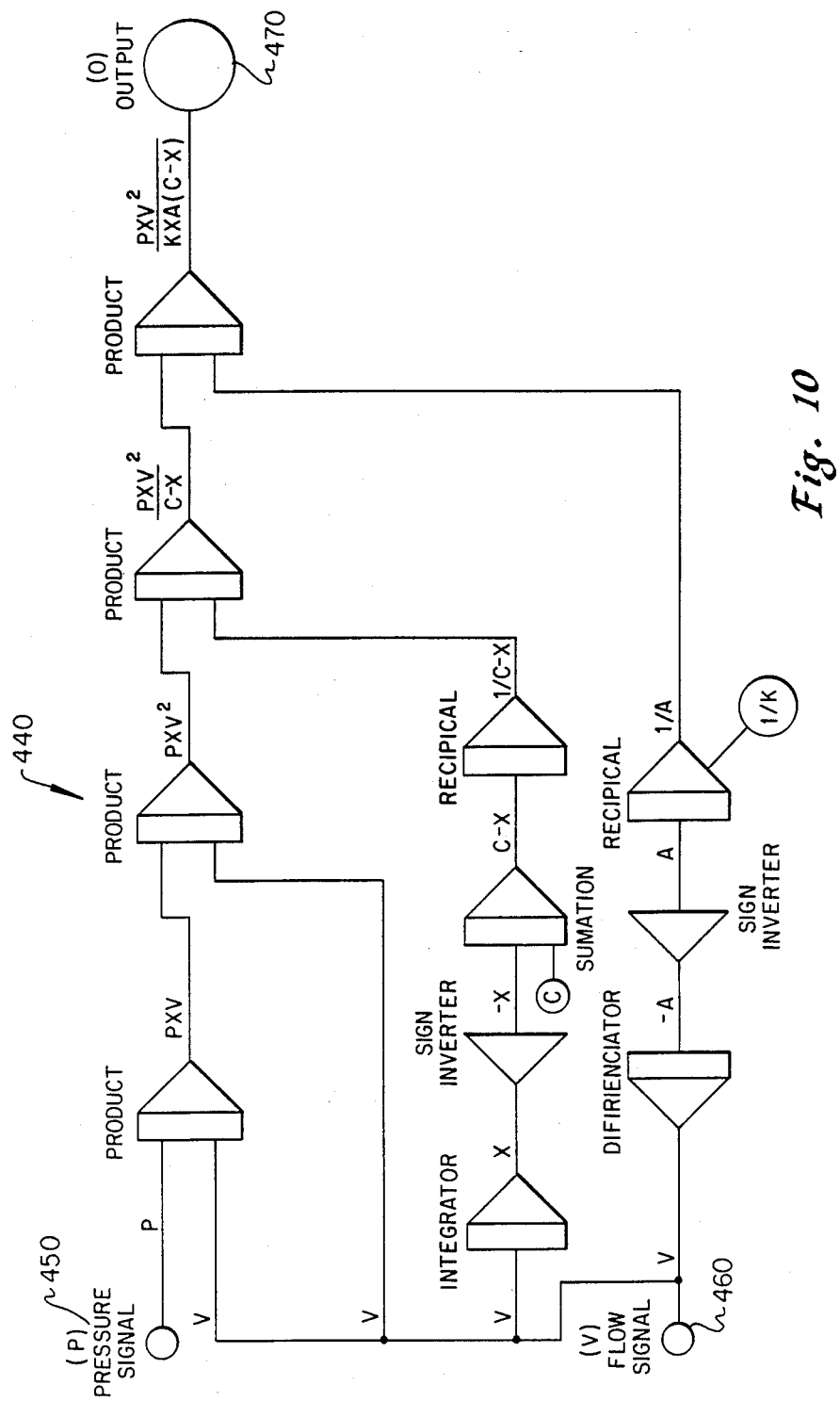
FIG. 10 is a perspective view of a second embodiment of an apparatus for determining the mass and velocity of a docking vessel.

FIG. 10 shows an alternate method of performing the necessary calculations for the electronic pilot spool 360 utilizing an analog circuit 440. The analog circuit of FIG. 10 is a simpler method of performing the data calculation for controlling the fluid flow but is not as versatile as the microprocessor 420. The analog circuit 440 is, however, a less costly alternative. In the analog circuit 440, the pressure signal 450 is equivalent to the pressure transducer 400 and the flow signal 460 is equivalent to the flow transducer 410. Various conventional operations occur along the analog circuit until the output 470 is reached. At this time, the output 470 transmits the data to the actuator pilot valve 380 and as in the microprocessor 420 alternative, the actuator pilot valve 380 utilizes the data to control the flow of the hydraulic fluid.

Although the invention has been described in detail, it is to be clearly understood that the same is by way of illustration and example only and is not to be taken by way of limitation, the spirit and scope of the invention being limited only to the terms of the appended claims.

I claim:

1. A pier cushioning system for protecting the pier from docking vessels comprising:
   a floating metal segment having a wood contact surface;
   a plurality of hollow metal cylindrical sliding elements connected to the contact surface for transmitting force from a docking vessel;
   a plurality of hydraulic cylinders having a shaft with an end piece connected to the sliding elements and a cylinder piston containing hydraulic fluid connected to the shaft for absorbing energy transmitted from the sliding elements;
   hollow flow channels associated with the hydraulic cylinders for providing a passageway for the hydraulic fluid;
   a valve assembly connected to the hollow flow channels and having means for controlling the flow of the hydraulic fluid in response to the pressure exerted upon and energy absorbed by the hydraulic cylinders;
   means associated with the valve assembly for determining the mass and velocity of the docking vessel and calculating the counterforce necessary to deaccelerate the docking vessel; and
   structural components connected to the hydraulic cylinders for transmitting the force absorbed by the hydraulic cylinders to the pier.

2. A pier cushioning system in accordance with claim 1 wherein the means for controlling the flow of the hydraulic fluid is an orifice control mechanism.

3. A pier cushioning system in accordance with claim 1 wherein the means for controlling the flow of the hydraulic fluid is an electronic pilot spool.

4. A pier cushioning system in accordance with claim 1 wherein the means for determining the mass and velocity of the docking vessel and calculating the necessity counterforce to deaccelerate the docking vessel is a microprocessor.

5. A pier cushioning system in accordance with claim 1 wherein the means for determining the mass and velocity of the docking vessel and calculating the necessary counterforce to deaccelerate the docking vessel is an analog electronic circuit.

6. A pier cushioning system in accordance with claim 1 wherein the means for controlling the flow of the hydraulic fluid is an electronic pilot spool that determines the mass and velocity of the docking vessel and calculates the necessary counterforce to deaccelerate the docking vessel by means of a microprocessor.

7. A pier cushioning system for protecting a pier from docking vessel comprising:
   a segment having a contact surface;
   a plurality of sliding elements connected to the contact surface of the segment for transmitting force;
   a plurality of hydraulic cylinders having a shaft with an end piece connected to the sliding elements and cylinder piston containing hydraulic fluid connected to the shaft for absorbing energy transmitted from the sliding elements;
   a valve assembly associated with the hydraulic cylinders and having means for controlling the flow of the hydraulic fluid;
   means associated with the valve assembly for determining the mass and velocity of the docking vessel; and
   structural components connected to the hydraulic cylinders for transmitting the force absorbed by the hydraulic cylinder to the pier.

8. A pier cushioning system in accordance with claim 7 wherein the means for controlling the flow of the hydraulic fluid comprises an orifice control mechanism.

9. A pier cushioning system in accordance with claim 7 wherein the means for controlling the flow of the hydraulic fluid comprises an electronic pilot spool.

10. A pier cushioning system in accordance with claim 7 wherein the electronic pilot spool is controlled by a microprocessor.

11. A pier cushioning system in accordance with claim 7 wherein the electronic pilot spool is controlled by an analog electronic circuit.

* * * * *